US011163863B2

(12) United States Patent
Ben Bouazza (10) Patent No.: US 11,163,863 B2
(45) Date of Patent: Nov. 2, 2021

(54) BIOMETRICS-BASED CONTROL DEVICE

(71) Applicant: RIFL, Villeneuve-la-Garenne (FR)

(72) Inventor: Jamal Ben Bouazza, Villeneuve-la-Garenne (FR)

(73) Assignee: RIFL, Villeneuve-la-Garenne (FR)

( * ) Notice: Subject to any disclaimer, the term of this patent is extended or adjusted under 35 U.S.C. 154(b) by 0 days.

(21) Appl. No.: 16/639,178

(22) PCT Filed: Feb. 18, 2019

(86) PCT No.: PCT/EP2019/053972
§ 371 (c)(1),
(2) Date: Feb. 14, 2020

(87) PCT Pub. No.: WO2019/158753
PCT Pub. Date: Aug. 22, 2019

(65) Prior Publication Data
US 2020/0233942 A1    Jul. 23, 2020

(30) Foreign Application Priority Data

Feb. 16, 2018   (EP) ..................................... 18305171

(51) Int. Cl.
*G06F 21/32*    (2013.01)
*G06F 16/2455*    (2019.01)

(52) U.S. Cl.
CPC .......... *G06F 21/32* (2013.01); *G06F 16/2455* (2019.01)

(58) Field of Classification Search
None
See application file for complete search history.

(56) References Cited

U.S. PATENT DOCUMENTS

2002/0178385 A1* 11/2002 Dent .................. G07C 9/00309
726/27
2008/0034411 A1* 2/2008 Aoyama ............. H04L 63/0861
726/5

(Continued)

FOREIGN PATENT DOCUMENTS

EP          1881461 A2      1/2008
EP          1884847 A1      2/2008
WO    WO-2005079311 A2 *   9/2005    ......... G06F 16/1787

OTHER PUBLICATIONS

International Search Report and Written Opinion dated Apr. 5, 2019, for International Patent Application No. PCT/EP2019/053972.

*Primary Examiner* — William J. Goodchild
(74) *Attorney, Agent, or Firm* — Karceski IP Law, PLLC (57) ABSTRACT

A biometrics-based control device includes a biometric sensor that acquires biometric data from a person. A user database contains biometric data items, whereby a biometric data item characterizes an authorized user. A processor causes the biometrics-based control device to execute a control action if biometric data acquired through the biometric sensor corresponds with a biometric data item in the user database. The biometrics-based control device establishes a communication link with an external device through a communication interface. The biometrics-based control device applies an administrator authentication condition for allowing the external device to access the user data base if the user database comprises at least one biometric data item that belongs to an administrator class. The administrator authentication condition consists of an acquisition of biometric data through the biometric sensor that corresponds with a biometric data item in the user database that belongs to the administrator class.

15 Claims, 5 Drawing Sheets

(56) References Cited

U.S. PATENT DOCUMENTS

| | | | |
|---|---|---|---|
| 2013/0227090 A1* | 8/2013 | Nissler | G06F 21/57 |
| | | | 709/220 |
| 2016/0132672 A1 | 5/2016 | Burke | |
| 2016/0260271 A1* | 9/2016 | Belhadia | G06F 21/35 |
| 2018/0283051 A1* | 10/2018 | Qiu | H04W 4/80 |
| 2018/0359798 A1* | 12/2018 | Shibuya | H04W 76/14 |

* cited by examiner

BIOMETRICS-BASED CONTROL DEVICE

CROSS-REFERENCE TO RELATED APPLICATION(S)

This is a National Stage Entry into the United States Patent and Trademark Office from International PCT Patent Application No. PCT/EP2019/053972, having an international filing date of Feb. 18, 2019, which relies for priority on European Patent Application No. EP18305171.3, filed on Feb. 16, 2018, the entire contents of both of which are incorporated herein by reference.

FIELD OF THE INVENTION

An aspect of the invention relates to a biometrics-based control device. The biometrics-based control device may be adapted, for example, to be mounted in an industrial control console, or panel, as a replacement for a conventional control device such as, for example, a push-button, a switch, or a selector. Other aspects of the invention relate to use of a biometrics-based control device, and a computer program for a biometrics-based control device.

BACKGROUND OF THE INVENTION

European patent EP1884847 describes a control member suitable for mounting in industrial control consoles as a replacement for a control member having mechanical operating means such as push-buttons, switches, selectors, tuners. A fingerprint sensor is used as operating means such that fingerprint recognition replaces a manual operation. A programmable controller compares an item of identification data of an operator, supplied by the fingerprint sensor, with identification data stored in a database. An output change is only authorised if the operator is recognised as being authorised. The control member is in an initialisation state following power-up when no identification data item is stored in the database. In that state, an item of identification data acquired using the fingerprint sensor is stored in the database as administrator identification data. An administrator is authorised to configure the control member.

Patent publication US20160132672 discloses a system for providing secure access to a controlled item. The system comprises a database of biometric signatures and a biometric sensor for receiving a biometric signal. The biometric signal is matched against members of the database of biometric signatures to thereby output an accessibility attribute. A secure access signal is then emitted, which conveys information dependent upon the accessibility attribute, Patent publication EP1881461 describes a personal authentication device that collates acquired biometric information of a subject with stored biometric information of persons belonging to a first group. When the subject is not determined authentic, the device sends the biometric information of the subject to an external device that holds biometric information of persons belonging to a second group. The device requests the external device to collate the biometric information of the subject with the biometric information of persons belonging to the second group.

SUMMARY OF THE INVENTION

There is a need for a solution that allows a biometrics-based control device to better meet at least one of the following criteria without compromising security: easy to install, easy to configure, and relatively inexpensive to manufacture.

In order to better address this need, in accordance with one aspect of the invention, a biometrics-based control device has a tamper-resistant housing that incorporates:
 a biometric sensor adapted to acquire biometric data from a person;
 a user database adapted to comprise biometric data items, a biometric data item characterizing an authorized user; and
 a processor adapted to cause the biometrics-based control device to execute a control action if biometric data acquired through the biometric sensor corresponds with a biometric data item in the user database; and
 a communication interface adapted to establish a communication link with an external device,
wherein:
 the biometrics-based control device is adapted to apply an administrator authentication condition for allowing the external device to access the user data base if the user database comprises at least one biometric data item that belongs to an administrator class, the administrator authentication condition consisting of an acquisition of biometric data through the biometric sensor that corresponds with a biometric data item in the user database that belongs to the administrator class.

In accordance with another aspect of the invention, a biometrics-based control device as defined hereinbefore is used for controlling an apparatus. In accordance with yet another aspect of the invention, a computer program product enables a processor in a biometrics-based control device to apply the administrator authentication condition as described hereinbefore.

In each of these aspects, a biometrics-based control device need not comprise a user interface, or may comprise only a relatively simple user interface. This allows relatively inexpensive manufacture. Installation and configuration can be done with an external device, such as, for example, a smart phone, having a feature-rich and user-friendly application. The external device may also be, for example, a basic keyboard, which may be combined with a basic display, or a user interface similar to a user interface that forms an integral part of a biometrics-based control device. The same external device can be used for installing and configuring numerous biometrics-based control devices. A high level of security is achieved because the external device is authorized to access a user database of a biometrics-based control device only on condition that a preregistered administrator has biometrically been authenticated by the biometrics-based control device itself. This prevents the external device from gaining access through faking or other fraudulent techniques.

For the purpose of illustration, some embodiments of the invention are described in detail with reference to accompanying drawings. This description will present features additional to those mentioned hereinbefore, as well as advantages which these additional features can provide.

DESCRIPTION OF EMBODIMENTS OF THE INVENTION

Figure 1:
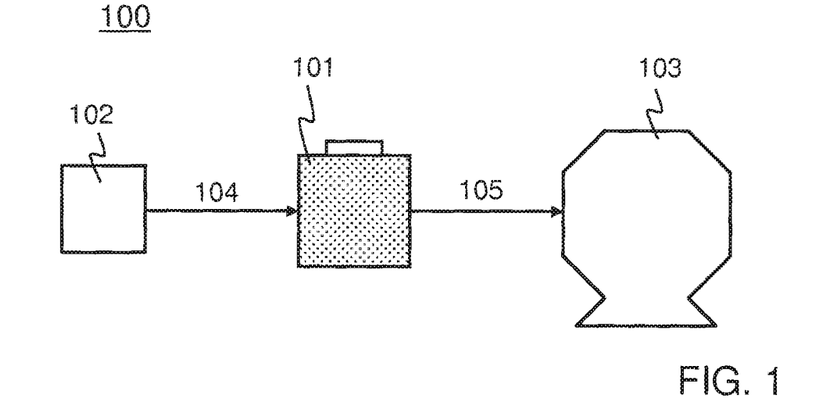
FIG. 1 is a block diagram of a biometrically controlled system.

FIG. 1 schematically illustrates a biometrically controlled system 100. The biometrically controlled system 100 is represented in a block diagram. The biometrically controlled system 100 comprises a biometrics-based control device 101, a power supply device 102, and a controlled apparatus 103. The biometrics-based control device 101 may be mounted in, for example, an industrial control console, or panel, as a replacement for a conventional control device.

The biometrics-based control device 101 receives a power supply voltage 104 from the power supply device 102. The biometrics-based control device 101 is coupled to the controlled apparatus 103. More specifically, the biometrics-based control device 101 may be coupled to, for example, a relay in the controlled apparatus 103, or to a control unit that is associated with the controlled apparatus 103. The controlled apparatus 103 may be, for example, a machine in a factory.

By way of illustration, an embodiment is described in which the biometrics-based control device 101 is functionally equivalent to a switch. The biometrics-based control device 101 will therefore be referred to hereinafter as biometric switch 101 by way of illustration. The biometric switch 101 can be in a closed state or in an open state.

The biometrically controlled system 100 basically operates as follows. In case the biometric switch 101 is in the closed state, the controlled apparatus 103 receives an activation signal 105. The controlled apparatus 103 is allowed to operate in that case. Conversely, in case the biometric switch 101 is in the closed state, the controlled apparatus 103 does not receive the activation signal 105. The controlled apparatus 103 cannot to operate in that case. The activation signal may be for example, in the form of a current that flows through the biometric switch 101, or a voltage.

The biometric switch 101 may switch from the open to the closed state, or vice versa, only when the biometric switch 101 has biometrically authenticated an authorized user. Accordingly, an activation of the controlled apparatus 103, as well as a deactivation of this apparatus, is subjected to a biometric authentication of an authorized user by the biometric switch 101. An arbitrary person cannot activate the controlled apparatus 103 when this apparatus is idle, nor can the person deactivate the controlled apparatus 103 when this apparatus is working.

The biometric switch 101 may operate, for example, in a monostable mode or in a bistable mode. In the monostable mode, the biometric switch 101 is, by default, in the open state. A biometric authentication of an authorized user makes the biometric switch 101 switch to the closed state. However, the biometric switch 101 will remain in the closed state only for a certain period. That is, the biometric switch 101 will return to the open state once this period has lapsed.

In the bistable mode, the biometric switch 101 remains in a certain state, which may be the open state or the closed state, until the biometric switch 101 has biometrically authenticated an authorized user. In case the biometric switch 101 is in the open state, a biometric authentication of an authorized user makes the biometrics switch 101 switch to the closed state. Conversely, in case the biometric switch 101 is in the closed state, a biometric authentication of an authorized user makes the biometrics switch 101 switch to the open state.

Figure 2:
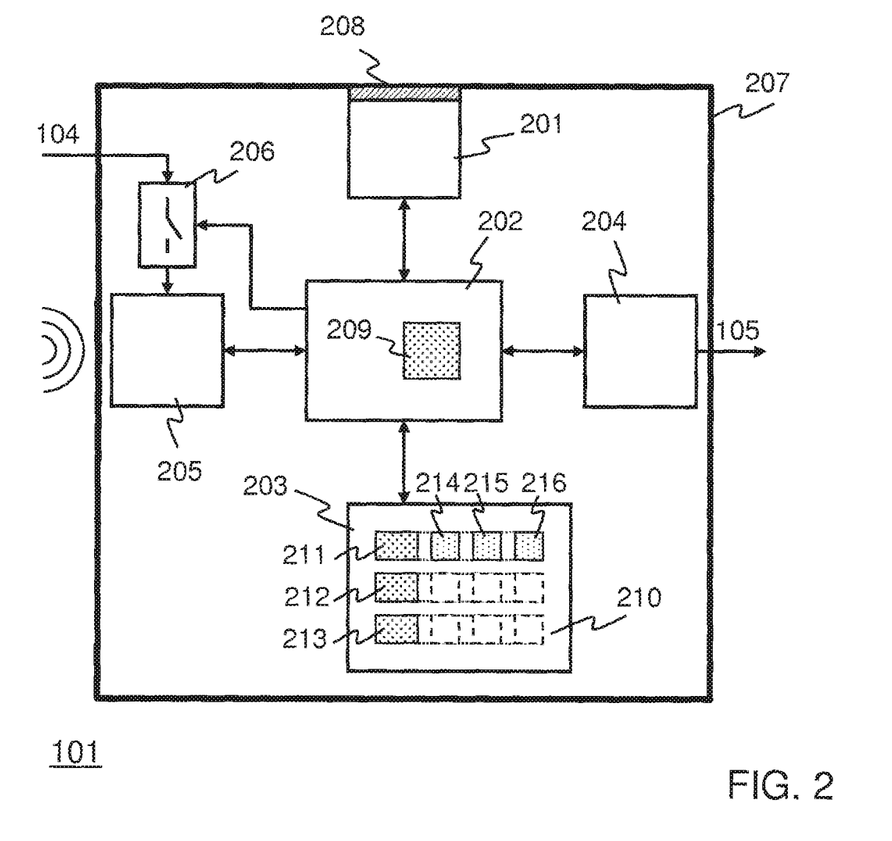
FIG. 2 is a block diagram of a biometrics-based control device in the biometrically controlled system.

FIG. 2 schematically illustrates the biometric switch 101 in more detail. The biometric switch 101 is represented in a block diagram. The biometric switch 101 comprises a biometric sensor 201, a processor 202, a data memory 203, an output circuit 204, a communication interface 205, and a communication enabling/disabling switch 206. These entities may be comprised in a housing 207 that is preferably tamper-resistant to a certain extent. The housing 207 may be provided with elements that allow the biometric switch 101 to be mounted in an industrial control console, or panel. The housing 207 may therefore be similar to that of a conventional mechanical switch for such a control console, or panel. Apart from the biometric sensor 201, the biometric switch 101 need not have any user interface by means of which a user can interact with the biometric switch 101.

The biometric sensor 201 may be, for example, a fingerprint sensor, an iris sensor, a microphone with speech recognition, or a camera with face recognition. By way of illustration, an embodiment is described in which the biometric sensor 201 is a fingerprint sensor. The biometric sensor 201 will therefore be referred to hereinafter as fingerprint sensor 201 by way of illustration. The fingerprint sensor 201 may comprise a touchable surface 208 situated in an opening in a front portion of the housing 207. Other parts of the fingerprint sensor 201 may be encapsulated in the housing 207 of the biometric switch 101 in a tamper-resistant manner.

The processor 202 contains a software program 209 that enables the biometric switch 101 to carry out various operations, which will be described hereinafter. The software program 209 may be stored in a program memory, which is not represented in FIG. 2 for the sake of simplicity. The processor 202 may further comprise an assembly of circuits that can execute the software program 209 such as, for example, an algorithmic logic unit, various registers, various cache memories, as well as other logic circuits. This assembly of circuits may be monolithically integrated on a single substrate, which may be a semiconductor substrate. This substrate may further include, for example, the aforementioned program memory.

The data memory 203 comprises a user database 210. The data memory 203 in which the user database 210 is stored may be non-volatile. The data memory 203 may composed of, for example, one or more memory circuits, or one or more other data storage devices, or a combination of these.

The user database 210 may comprise preregistered biometric data items 211, 212, 213. A preregistered biometric data item typically comprises biometric data that the biometric sensor 201 has acquired from a person. In this embodiment, the biometric data is fingerprint data. Thus, in this embodiment, a preregistered biometric data item comprises fingerprint data that uniquely characterizes an authorized user.

A preregistered biometric data item may belong to a class among several different possible classes of preregistered biometric data items. A preregistered biometric data item may belong to, for example, an operator class or an administrator class. There may be other classes, such as, for example, a super administrator class. The class to which a preregistered biometric data item 211 belongs may be stored in the user database 210 as an attribute 214 that is associated with the preregistered biometric data item 211.

Various attributes, other than a class, may be associated with a preregistered biometric data item. For example, personal identification data 215 may be associated with a preregistered biometric data item 211 that uniquely characterizes an authorized user. The personal identification data 215 may comprise, for example, a name of the authorized user. Another attribute that may be associated with a preregistered biometric data item 211 may concern user rights. For example, such a user right attribute 216 may define specific days, or specific time intervals, or both, during which the authorized user concerned may operate the biometric switch 101.

The output circuit 204 of the biometric switch 101 is coupled to the controlled apparatus 103. The processor 202 controls the output circuit 204 so that the output circuit 204 is in a closed state or in an open state. A control action of the biometric switch 101 comprises switching the output circuit 204 from the open state to the closed state, as well as switching the output circuit 204 from the closed state to the open state. In the closed state, the output circuit 204 allows the controlled apparatus 103 to receive the activation signal 105. Conversely, in the open state, the output circuit 204 prevents the controlled apparatus 103 from receiving the activation signal 105. The output circuit 204 may be in the form of, for example, a transistor having a control node that may be coupled to the processor 202.

The communication interface 205 allows the biometric switch 101 to establish a communication link with an external device. The communication link may be wireless. For example, the communication interface 205 may operate in accordance with a Bluetooth protocol so as to establish a Bluetooth link with an external device (Bluetooth is a registered trademark of Bluetooth SIG, Inc.). The external device may be, for example, a so-called smart phone, a basic keyboard, which may be combined with a basic display, or a user interface similar to a user interface that forms an integral part of a biometrics-based control device. By way of illustration, an embodiment is described in which the communication interface 205 may establish a Bluetooth link with a smart phone. The communication interface 205 will therefore be referred to hereinafter as Bluetooth interface 205 by way of illustration.

In this embodiment, the communication enabling/disabling switch 206 is coupled between the Bluetooth interface 205 and an electrical contact of the biometric switch 101 that receives the power supply voltage 104. The communication enabling/disabling switch 206 is by default in an open state. This implies that the Bluetooth interface 205, by default, does not receive the power supply voltage 104 that is applied to the biometric switch 101 illustrated in FIG. 1. Therefore, the Bluetooth interface 205 is, by default, disabled.

Figure 3:
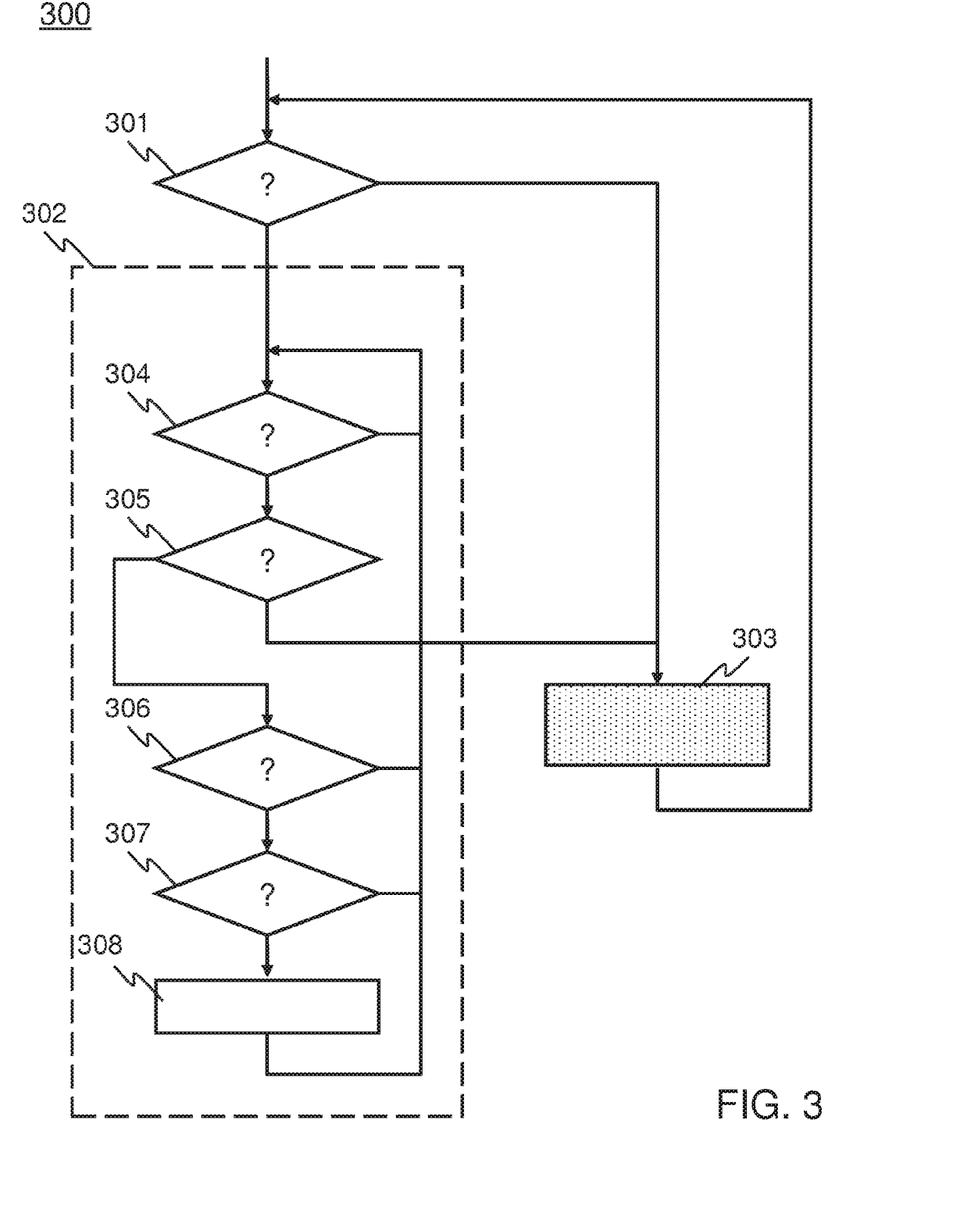
FIG. 3 is a flow chart diagram of a method of operation of the biometrics-based control device.

FIG. 3 schematically illustrates a method of operation 300 of the biometric switch 101. This method is illustrated in a flow chart diagram. The method 300 comprises a series of steps that the biometric switch 101 illustrated in FIG. 2 may carry out when the processor 202 executes the software program 209. The flow chart diagram of FIG. 3 may thus be regarded as a representation of at least a part of the software program 209 in the processor 202 of the biometric switch 101 illustrated in FIG. 2.

The method 300 illustrated in FIG. 3 may commence when the biometric switch 101 is activated. The biometric switch 101 may be activated by applying a suitable power supply voltage to the biometric switch 101. Thus, referring to FIG. 1, the biometric switch 101 is activated when the biometric switch 101 starts receiving the power supply voltage 104. However, the Bluetooth interface 205 of the biometric switch 101 will not be activated. This is because the communication enabling/disabling switch 206 is, by default, in the open state, which prevents the Bluetooth interface 205 from receiving the power supply voltage 104.

In an administrator presence verification step 301, the processor 202 verifies whether the following condition is true or false: the user database 210 comprises at least one biometric data item that belongs to the administrator class. If this condition is true, the processor 202 carries out a fingerprint recognition routine 302, which is also illustrated in FIG. 3. If the aforementioned condition is false, the processor 202 carries out a configuration routine 303. The configuration routine 303 will be described first. Thereafter, the fingerprint recognition routine 302 will be described.

Figure 4:
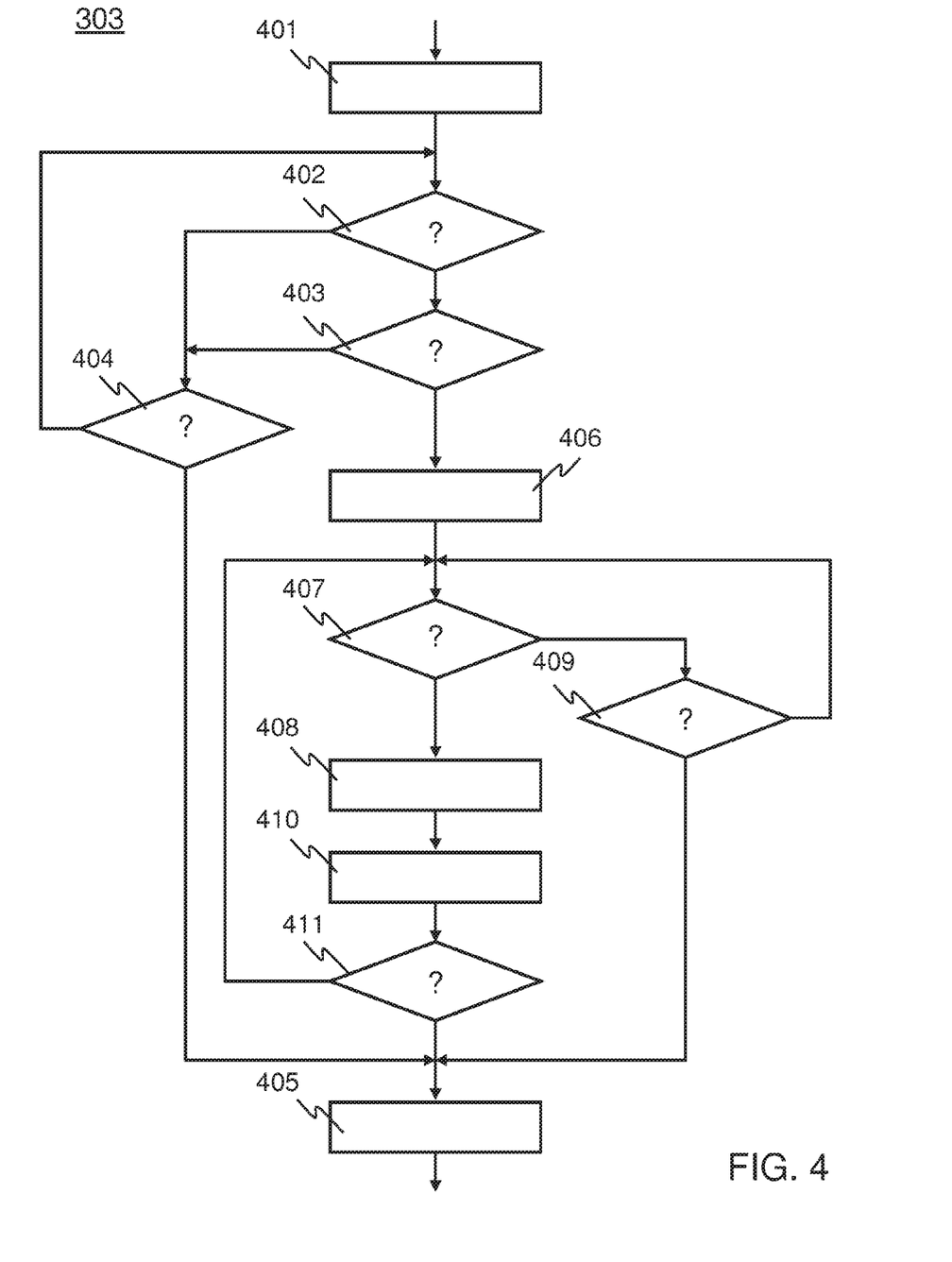
FIG. 4 is a flow chart diagram of a configuration routine within the method of operation of the biometrics-based control device.

FIG. 4 schematically illustrates the configuration routine 303 in a flow chart diagram. The configuration routine 303 comprises a series of steps that the biometric switch 101 may carry out as part of the method of operation 300 illustrated in FIG. 3. The configuration routine 303 is thus also part of the software program 209 in the processor 202 of the biometric switch 101 illustrated in FIG. 2. The flow chart diagram of FIG. 4 may be regarded as a representation of this part of the software program 209.

The configuration routine 303 commences with a communication enabling step 401, in which the processor 202 sets the communication enabling/disabling switch 206 in a closed state. As a result, the Bluetooth interface 205 will receive the power supply voltage 104. The Bluetooth interface 205 will therefore be enabled. This implies that the Bluetooth protocol is activated.

The configuration routine 303 continues with a connection verification step 402, in which the processor 202 verifies whether the following condition is true or false: an external device has established a Bluetooth link with the biometric switch 101. If this condition is true, the processor 202 may subsequently carry out an authentication verification step 403, which will be described hereinafter. In case no external device has established a Bluetooth link with the biometric switch 101, the processor 202 carries out a connection establishment time-out verification step 404.

In the connection establishment time-out verification step 404, the processor 202 verifies whether the following condition is true or false: a predetermined time interval starting at the communication enabling step 401, which has most recently been carried out, has lapsed. If this condition is true, the processor 202 may end the configuration routine 303 by carrying out a communication disabling step 405, which will be described hereinafter. In case the predetermined time interval has not yet lapsed, the processor 202 may carry out the connection verification step 402 new.

In the authentication verification step 403, the processor 202 verifies whether the following condition is true or false: the external device has provided correct authentication data. The authentication data may be in the form of, for example, a password. As another example, the authentication data may be in the form of an electronic certificate. If the aforementioned condition is true, the processor 202 may subsequently carry out a reporting step 406, which will be described hereinafter. In case the external device has not provided correct authentication data, the processor 202 may carry out the connection establishment time-out verification step 404. The processor 202 may directly terminate the configuration routine 303 if the external device has made a number of unsuccessful attempts to provide correct authentication data and this number corresponds with a maximum allowed number of attempts.

In the reporting step 406, the biometric switch 101 may send certain information related to the external device. This information may comprise, for example, an indication on whether the user database 210 comprises at least one biometric data item of the administrator class, or not. The biometric switch 101 may send such general information at its own initiative once the Bluetooth link with the external device has been established and, optionally, the external device has been authenticated. The biometric switch 101 may send specific information in response to an inventory command from the external device, which will be described hereinafter. Once the reporting step 406 has been completed, and information has been communicated to the external device, the processor 202 may subsequently carry out an instruction reception step 407.

In the instruction reception step 407, the processor 202 verifies whether the following condition is true or false: the processor 202 has received an instruction from the external device. If this condition is true, the processor 202 may subsequently carry out an instruction execution step 408, which will be described hereinafter. In case the processor 202 has not received an instruction from the external device, the processor 202 may carry out a data communication time-out verification step 409.

In the data communication time-out verification step 409, the processor 202 verifies whether the following condition is true or false: a predetermined time interval starting at the most recent reception of data has lapsed. If this condition is true, the processor 202 may end the configuration routine 303 by carrying out the communication disabling step 405, which will be described hereinafter. In case the predetermined time interval has not yet lapsed, the processor 202 may carry out the instruction reception step 407 anew.

In the instruction execution step 408, the processor 202 executes the instruction that has been received from the external device. The instruction may concern, for example, a modification in the user database 210. Several examples will be provided hereinafter. Once the processor 202 has executed the instruction concerned, the processor 202 may carry out a confirmation step 410, which will be described hereinafter.

Let it be assumed that the instruction received is a user addition command. In that case, the processor 202 may add a biometric data item in the user database 210. In order to so, the following operations may be carried out following receipt of the user addition command. A finger of a user to be authorized is placed on the fingerprint sensor 201. The fingerprint sensor 201 acquires fingerprint data from the user to be authorized. The processor 202 includes the fingerprint data in the biometric data item that is added to the user database 210.

The user addition command may comprise user identification data, such as, for example, a name of the user to be authorized. The processor 202 may extract this user identification data from the user addition command. The processor 202 may then store the user identification data in association with the biometric data item. In this embodiment, the user identification data is stored as an attribute of the biometric data item.

Let it now be assumed that the instruction is a user deletion command. The user deletion command may comprise user identification data, such as, for example, a name of an authorized user. The processor 202 may extract this user identification data from the user deletion command. The processor 202 may then identify, in the user database 210, a biometric data item that is stored in association with the user identification data that has been extracted from the user deletion command. The processor 202 may subsequently delete this biometric data item from the user database 210, so that the person concerned is no longer authorized to use the biometric switch 101.

In case the user database 210 does not comprise any biometric data item of the administrator class, the instruction may be an administrator creation instruction. This will typically be the case if the configuration routine 303 is carried out for the first time. Following receipt of the administrator creation command, a finger of a person to be registered as a first administrator is placed on the touchable surface 208 of the fingerprint sensor 201. The fingerprint sensor 201 acquires fingerprint data from the person to be registered as the first administrator. The processor 202 includes the fingerprint data in a first biometric data item of the administrator class, which then stored in the user database 210.

In the confirmation step 410, the processor 202 sends a confirmation message to the external device through the Bluetooth link. The confirmation message indicates that the instruction received has been executed. In case the processor 202 has not been able to execute the instruction concerned, the confirmation message may indicate this and may also indicate a reason why the instruction could not be executed. Once the processor 202 has executed the confirmation step 410, the processor 202 may execute a termination verification step 411.

In the termination verification step 411, the processor 202 verifies whether the following condition is true or false: the external device has sent an end of configuration message. If this condition is true, the processor 202 carries out the communication disabling step 405, which will be described hereinafter. In case the external device has not sent an end of configuration message, the processor 202 may continue the configuration routine 303 by subsequently carrying out anew the instruction reception step 407, which has been described hereinbefore.

The configuration routine 303 ends with the communication disabling step 405. In this step, the processor 202 sets the communication enabling/disabling switch 206 in the open state again. As a result, the Bluetooth interface 205 will no longer receive the power supply voltage. The Bluetooth interface 205 will therefore be disabled. This implies that the Bluetooth communication protocol is deactivated.

The configuration routine 303 may thus end in various manners. The configuration routine 303 may end because a time-out has been reached: no external device has established a Bluetooth link within the predetermined time interval concerned, or no instruction has been received within the predetermined time interval concerned. This implies that the Bluetooth interface 205, which was set in the enabled state at the start of the configuration routine 303, is set back in the disabled state if no Bluetooth link has been established with an external device within the predetermined time interval since the setting of the Bluetooth interface 205 in the enabled state. In case a Bluetooth link has been established with an external device, the Bluetooth interface 205 is set back in the disabled state if within the predetermined time interval no data has been received from the external device.

The configuration routine 303 may also end because the external device that was involved in the configuration routine 303 has instructed the biometric switch 101 to end and exit this routine. That is, the Bluetooth interface 205 is set back in the disabled state in response to a deactivation command from an external device with which the biometric switch 101 has established a Bluetooth link.

Once the processor 202 has ended the configuration routine 303, the processor 202 may subsequently carry out anew the administrator presence verification step 301 of the method illustrated in FIG. 3. Since user database 210 will now typically comprise a biometric data item that belongs to the administrator class, the processor 202 will subsequently carry out the fingerprint recognition routine 302.

Referring again to FIG. 3, the fingerprint recognition routine 302 commences with a fingerprint presence verification step 304. In this step, the processor 202 verifies whether the following condition is true or false: the fingerprint sensor 201 acquires fingerprint data from a user who has placed a finger on the touchable surface 208 of the fingerprint sensor 201, or not. If this condition is true, the processor 202 subsequently carries out an administrator identification step 305, which will be described hereinafter. In case the fingerprint sensor 201 does not acquire any fingerprint data, the processor 202 continues carrying out the fingerprint presence verification step 304.

In the administrator identification step 305, the processor 202 verifies whether the following condition is true or false: the fingerprint data that has been acquired corresponds with a preregistered biometric data item in the user database 210 that belongs to the administrator class, or not. If the aforementioned condition is true, the processor 202 carries out the configuration routine 303 described hereinbefore with reference to FIG. 4. If the fingerprint data that has been acquired does not correspond with any preregistered biometric data item that belongs to the administrator class, the processor 202 carries out an operator identification step 306.

In the operator identification step 306, the processor 202 verifies whether the following condition is true or false: the fingerprint data that has been acquired corresponds with a preregistered biometric data item in the user database 210 that belongs to the operator class. If the aforementioned condition is true, the processor 202 may subsequently carry out a user right verification step 307, which will be described hereinafter. Conversely, if the aforementioned condition is false, the processor 202 may recommence the fingerprint recognition routine 302 by carrying out the fingerprint presence verification step 304 anew. In addition, the processor 202 may cause a transducer, which may be acoustic or visual, to indicate that no authorized user has been recognized.

In the user right verification step 307, the processor 202 verifies whether the following condition is true or false: a user right attribute is associated with the preregistered biometric data item, which was found to correspond with the fingerprint data that has been acquired, or not. If the aforementioned condition is true, the processor 202 then checks whether the user right attribute allows the authorized user concerned to operate the biometric switch 101, or not. For example, the user right attribute may define certain dates and time slots when the user concerned may operate the biometric switch 101. If the authorized user is allowed to operate the biometric switch 101, the processor 202 may subsequently carry out a control action step 308.

In the control action step 308, the processor 202 causes the biometric switch 101 to execute a control action. In this embodiment, the control action involves a state change of the output circuit 204. In case the biometric switch 101 operates in the monostable mode, the control action may consist in making the output circuit 204 switch from the open state to the closed state, and then making the output circuit 204 switch back to the open state after a certain delay, which may be programmable. In case the biometric switch 101 operates in the bistable mode, the control action may consist in making the output circuit 204 switch to the closed state if the output circuit 204 was in the open state. Conversely, the control action may consist in making the output circuit 204 switch to the open state if the output circuit 204 was in the closed state.

If the user right attribute is such that the authorized user is not allowed to presently operate the biometric switch 101, the processor 202 may recommence the fingerprint recognition routine 302 by carrying out the fingerprint presence verification step 304 anew. The processor 202 may optionally cause a transducer to indicate insufficiency of rights.

In case no user right attribute is associated with the preregistered biometric data item, the processor 202 may directly carry out the control action step 308. In any event, once the control action step 308 has been carried out, the processor 202 may recommence the fingerprint recognition routine 302 by carrying out the fingerprint presence verification step 304 anew.

The biometric switch 101 described hereinbefore thus applies an administrator authentication condition for allowing an external device to access the user database 210 if the user database 210 comprises at least one biometric data item that belongs to the administrator class. In this embodiment, the administrator authentication condition consists of an acquisition of fingerprint data through the fingerprint sensor 201 that corresponds with a biometric data item in the user database 210 that belongs to the administrator class. The administrator authentication condition corresponds with the administrator identification step 305 that constitutes a gateway for entering the configuration routine 303, which activates the Bluetooth interface 205.

More specifically, the biometric switch 101 prevents, by default, data from an external device to be transferred to the processor 202 if the user database 210 comprises at least one biometric data item that belongs to the administrator class. A transfer of data from an external device to the processor 202 is allowed only if the administrator authentication condition is satisfied. In this embodiment, this is achieved by the biometric switch 101 disabling, by default, the Bluetooth interface 205 if the user database 210 comprises at least one biometric data item that belongs to the administrator class. The Bluetooth interface 205 is temporarily enabled only if the administrator authentication condition is satisfied.

Figure 5:
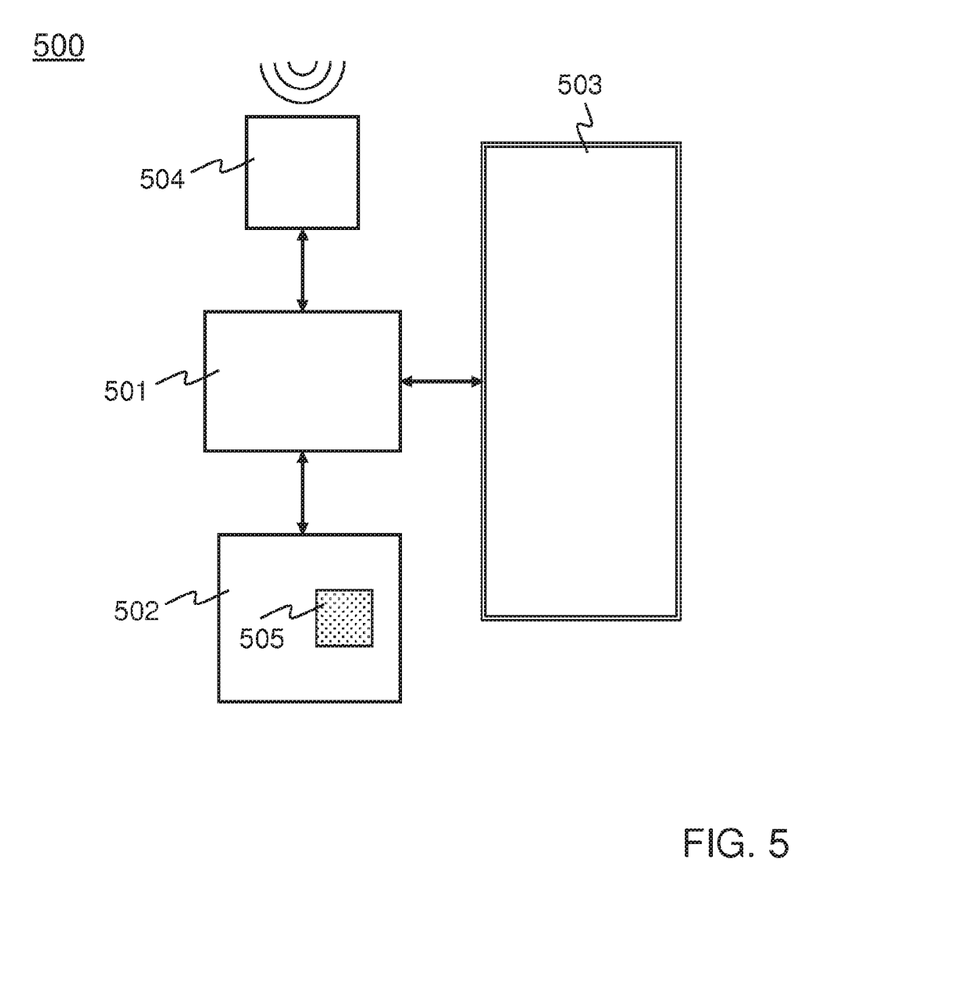
FIG. 5 is a block diagram of an external device with which the biometrics-based control device can establish a communication link.

FIG. 5 schematically illustrates an external device 500 with which the biometrics-based control device 101 can establish a Bluetooth link. The external device 500 is represented in a block diagram. As mentioned hereinbefore, the external device 500 may be, for example, a so-called smart phone. The external device 500 comprises a processor 501, a program memory 502, a user interface 503, and a Bluetooth interface 504. The program memory 502 contains a configuration application software program 505, which enables the external device 500 to carry out various operations that will be described hereinafter. The user interface 503 may comprise, for example, a touch screen and will therefore be referred to hereinafter as touch screen 503 by way of illustration. The Bluetooth interface 504 of the external device 500 will be referred to hereinafter as external device Bluetooth interface 504 for reasons of convenience.

Figure 6:
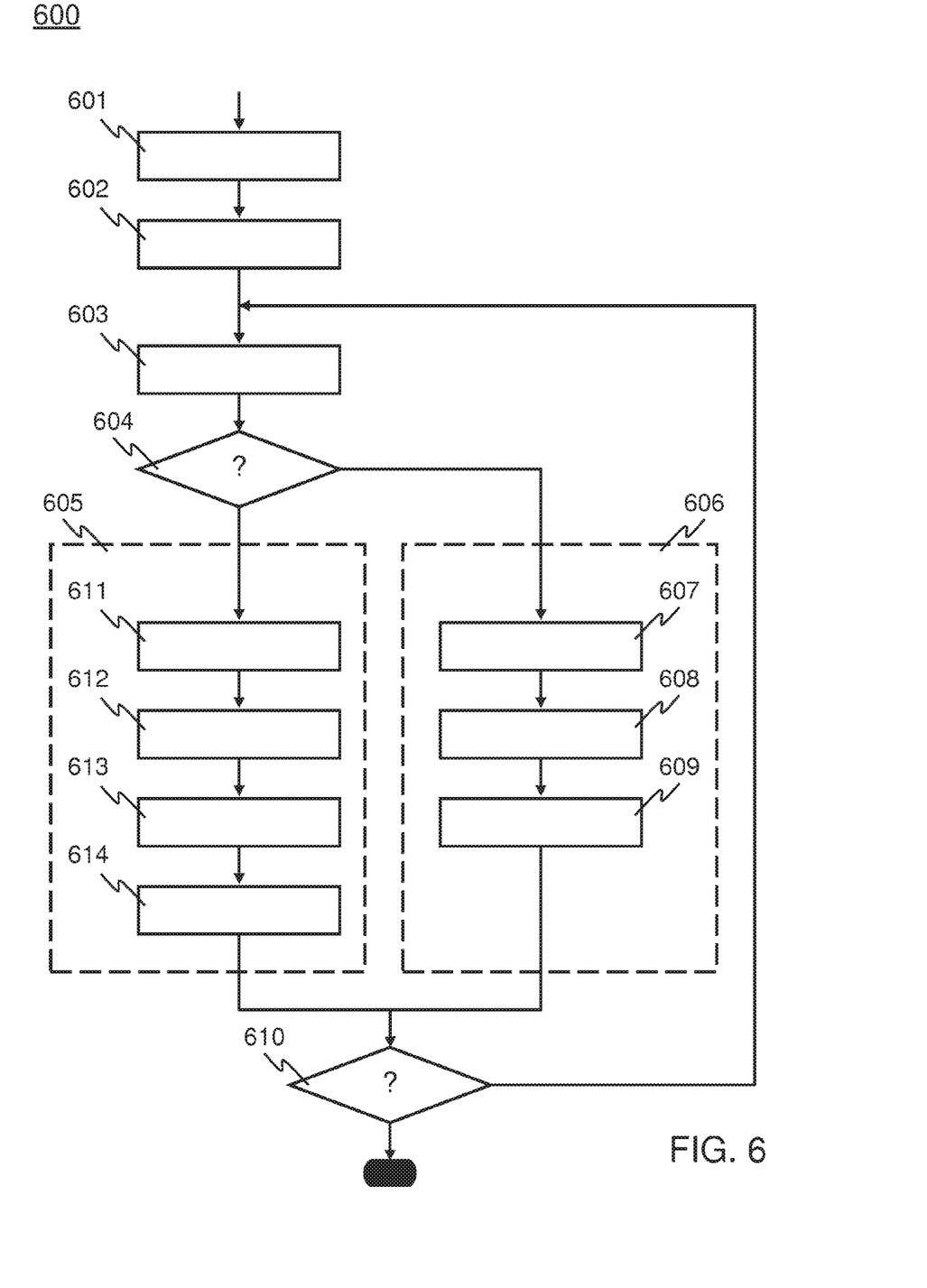
FIG. 6 is a flow chart diagram of a configuration control method that the external device may carry out.

FIG. 6 schematically illustrates a configuration control method 600 that the external device 500 may carry out. The configuration control method 600 is represented in a flow chart diagram. The configuration control method 600 comprises a series of steps that the external device 500 may carry out when the processor 501 executes the configuration application software program 505. The flow chart diagram of FIG. 6 may thus be regarded as a representation of at least a part of the configuration application software program 505 in the program memory 502 of the external device 500. The configuration control method 600 may commence, for example, when an operator holding the external device 500 selects an icon on the touch screen 503 that represents the configuration application software program 505.

In a reconnaissance step 601, the external device 500 identifies a set of biometrics-based control devices that are within a communication range of the external device Bluetooth interface 504. The external device 500 may then display the biometrics-based control devices that have been identified on the touch screen 503 in the form of, for example, a list. The biometric switch 101 described hereinbefore with reference to FIGS. 1 to 4 may be one of these identified biometrics-based control devices. In case there is no biometrics-based control device within the communication range, the external device 500 may display an indication "no devices identified" on the touch screen 503. The external device 500 may then carry out the reconnaissance step 601 anew. The external device 500 may end the configuration control method 600 if no biometrics-based control device has been identified within a predetermined time interval after the start of this method.

In a selection step 602, the external device 500 may receive an indication of a selection of a biometrics-based control device among the list of biometrics-based control devices that have been identified. This indication may be in the form of, for example, the operator touching the touch screen 503 in a zone that is associated with the biometrics-based control device. The external device 500 may subsequently try to establish a Bluetooth link with the biometrics-based control device through the external device Bluetooth interface 504. In the process of doing so, the external device 500 may present authentication data to the biometrics-based control device. In case the external device 500 does not succeed in establishing a Bluetooth link with the biometrics-based control device, an indication "no link can be established" may be displayed on the touch screen 503. The external device 500 may then carry out the reconnaissance step 601 anew.

In the sequel, it is assumed that the external device 500 has established a Bluetooth link with the biometric switch 101 described hereinbefore with reference to FIGS. 1 to 4. This implies that one of the following two cases apply. In case the user database 210 of the biometric switch 101 does not yet comprise any biometric data item that belongs to the administrator class, the biometric switch 101 enters into the configuration routine 303 thereby enabling the Bluetooth interface 205 of the biometric switch 101. In that case, the external device 500 may directly establish a Bluetooth link with the biometric switch 101 and then gain access to the user database 210, without this requiring any fingerprint authentication. This case typically applies when the biometric switch 101 is installed. The user database 210 will then typically be empty.

In the other case, the user database 210 of the biometric switch 101 comprises at least one biometric data item that belongs to the administrator class. In that case, the external device 500 can establish a Bluetooth link with the biometric switch 101 only if the biometric switch 101 has authenticated a fingerprint of a person who has previously been registered as administrator. That is, establishment of a Bluetooth link is subjected to an administrator authentication condition, which consists in the biometric switch 101 acquiring fingerprint data that corresponds with a biometric data item in the user database 210 that belongs to the administrator class. Only if this administrator authentication condition is satisfied, will the biometric switch 101 enable the Bluetooth interface 205, thereby allowing the external device 500 to directly establish a Bluetooth link with the biometric switch 101. The external device 500 may then gain access to the user database 210

Once the external device 500 has established a Bluetooth link with the biometric switch 201, the external device 500 may carry out an information acquisition step 603. In this step, the external device 500 may obtain information from the biometric switch. Since the administrator authentication condition, if applicable, has been satisfied, this information may include data from the user database 210, such as, for example, respective sets of attributes associated with respective biometric data items that are stored in the user database 210. In order to obtain such information, the external device 500 may transmit an information request to the biometric switch 101. Alternatively, the biometric switch 101 may send certain information at its own initiative, for example, in the reporting step 406 of the configuration routine 303 described hereinbefore with reference to FIG. 4

In an administrator verification step 604, the external device 500 verifies whether the following condition is true or false: the user database 210 of the biometric switch 101 comprises at least one biometric data item that belongs to the administrator class. In case the aforementioned condition is true, the external device 500 may carry out a user database management routine 605, which will be described hereinafter. In case the user database 210 does not comprise any biometric data item that belongs to the administrator class, the external device 500 carries out an administrator creation routine 606 that is described in the following paragraphs. The user database management routine 605 and the administrator creation routine 606 are both complementary with the configuration routine 303 that the biometric switch 101 may carry out as described hereinbefore with reference to FIG. 4.

The administrator creation routine 606 may begin with an administrator specification step 607. In this step, the touch screen 503 of the external device 500 displays a form that allows the user of the external device 500 to specify personal identification data of a person who will become a first registered administrator of the biometric switch 101. The form may comprise various fields, for example, a field for the family name of this first registered administrator, a field for the first name of that person, or a field for an identification number, or any combination of these fields. The user of the external device 500 may enter a string of alphanumerical characters in a field by means of, for example, a keyboard that is displayed on the touch screen 503.

In an administrator creation instruction transmission step 608, the external device 500 transmits, through the Bluetooth link that has been established, an administrator creation instruction to the biometric switch 101. In addition thereto, the external device 500 may transmit the personal identification data that has been specified. The biometric switch 101 may then store the personal identification data in association with a biometric data item of the administrator class, which is acquired and stored in response to the administrator creation instruction.

In an administrator creation reporting step 609, the external device 500 may receive a confirmation message from the biometric switch 101 confirming that a first biometric data item of the administrator class has been added to the user database 210. In that case, the external device 500 may display a representation of this confirmation on the touch screen 503. The external device 500 may also store the confirmation message, or an equivalent thereof, in a log file, which may be general or specifically associated with the biometric switch 101 concerned. The external device 500 may also carry out the aforementioned operations in case an error message is received instead of the confirmation message. In that case, the external device 500 may carry out the administrator creation instruction transmission step 608 anew.

The administrator creation routine 606 may end with the administrator creation reporting step 609 described hereinbefore. The external device 500 may subsequently carry out an end of application verification step 610, which will be described hereinafter.

The user database management routine 605 may begin with an instruction specification step 611. In this step, the external device 500 may display various types of instructions on the touch screen 503, such as, for example, a user addition command, a user deletion command, a user right modification command, or an administrator addition command. This display of commands may be in the form of a menu. The user of the external device 500 may select one of the commands by, for example, touching the touch screen 503 in a zone that is associated with the command concerned. Once the external device 500 has detected this, the external device 500 may subsequently allow the user to define one or more attributes of the command that has been selected.

In an attribute definition step 612, the touch screen 503 of the external device 500 may display a form that allows the user of the external device 500 to specify at least one attribute of the command that has been selected. An attribute may comprise, for example, personal identification data of a person who should be added or deleted as an authorized user of the biometric switch 101. Another attribute may define specific rights of the authorized user.

In an instruction transmission step 613, the external device 500 transmits the selected command to the biometric switch 101, as well as the attributes that have been specified for this command. The instruction transmission step 613 is complementary with the instruction reception step 407 in the configuration routine 303 that the biometric switch 101 may carry out as described hereinbefore with reference to FIG. 4

In an execution reporting step 614, the external device 500 may receive a confirmation message from the biometric switch 101 confirming that the command concerned has been executed. The external device 500 may display a representation of this confirmation on the touch screen 503. The external device 500 may also store the confirmation message, or an equivalent thereof, in the log file. The external device 500 may also carry out the aforementioned operations in case an error message is received instead of the confirmation message. In that case, the external device 500 may carry out the instruction transmission step 613 anew.

The user database management routine 605 may end with the execution reporting step 614 described hereinbefore. The external device 500 may subsequently carry out the end of application verification step 610, which is described in the following paragraph.

In the end of application verification step 610, the external device 500 verifies whether the following condition is true or false: the external device 500 has received an indication that the user wishes to exit the configuration application software program 505, or not. If the aforementioned condition is true, the external device 500 may send an end of configuration message to the biometric switch 101. The external device 500 may verify that the end of configuration message has been taken into account by the biometric switch 101. For example, the external device 500 may verify that the Bluetooth link with the biometric switch 101 has been terminated, which indicates that the biometric switch 101 has deactivated its Bluetooth interface 205. If needed, the external device 500 may again send an end of configuration message until this verification is positive. The external device 500 may then terminate the configuration control method 600.

In case the external device 500 has not received an indication that the user wishes to exit the configuration application software program 505, the external device 500 may continue the configuration control method 600. For example, the external device 500 may carry out the inventory acquisition step 603 anew, which has been described hereinbefore.

Notes

The embodiments described hereinbefore with reference to the drawings are presented by way of illustration. The invention may be implemented in numerous different ways. In order to illustrate this, some alternatives are briefly indicated.

The invention may be applied in numerous types of products or methods that involve biometrics-based control. The invention may be applied in any type of biometrics-based control device that comprises a communication interface through which the biometrics-based control device can establish a communication link with an external device. In the presented embodiments, a biometrics-based control device executes a control action that comprises switching an output circuit from one to the other of the following two states: an open state and a closed state. In other embodiments, a biometrics-based control device may be capable of carrying out more complex control actions, such as, for example, a selective transfer of a subset of control signals among a set of control signals, whereby the subset may depend on user rights. Referring to the biometric switch 101 illustrated in FIG. 2, such an embodiment may be obtained, for example, by replacing the output circuit 204 by a different type of controllable circuit, which may be more complex and which may thus have various outputs. In addition, the software program 209 may be adapted to enable the processor 205 to change a state of the controllable circuit upon biometric identification of an authorized operator.

There are numerous different ways of implementing a biometrics-based control device in accordance with the invention. In the presented embodiments, a biometrics-based control device comprises a biometric sensor of a specific type, namely a fingerprint sensor, which acquires fingerprint data. In other embodiments, a biometrics-based control device may comprise a biometric sensor of a different type, such as, for example, an iris sensor. In such an embodiment, the biometric data that is acquired and included in a stored biometric data item may comprise iris data. The biometric sensor may also be in the form of, for example, a microphone with speech recognition, or a camera with face recognition. A voice or a face, or a combination of both, may constitute biometric data that is characteristic of a person and that can be recognized by an algorithm as belonging to that person.

There are numerous different ways of applying an administrator authentication condition in a biometric-based control device in accordance with the invention, so as to allow or to prevent an external device from accessing a user database and, in particular, from modifying the user database. In the presented embodiments, an external device is allowed or prevented from accessing a user database by enabling or disabling, respectively, a communication interface depending on whether the administrator authentication condition is satisfied, or not. In other embodiments, a biometrics-based control device may comprise a data path between a communication interface and a processor, whereby the data path can be in an open state or in a closed state depending on whether the administrator authentication condition is satisfied, or not, respectively. In such an embodiment, the communication interface may be active by default. In yet other embodiments, a biometrics-based control device may be arranged so that a processor may recognize commands that originate from an external device, whereby the processor is programmed to accept or refuse these commands depending on whether the administrator authentication condition is satisfied, or not, respectively.

There are numerous different ways in which a biometrics-based control device in accordance with the invention may interact with an external device. In the presented embodiments, a biometrics-based control device requires an external device to authenticate itself. In other embodiments, such an authentication may not be required; satisfying the administrator authentication condition may be sufficient to gain access to a user database. In the presented embodiments, a biometrics-based control device may spontaneously send information concerning biometric data items present in a user database to an external device, once access to the user database has been granted. In other embodiments, a biometrics-based control device may send such information on specific request only, whereby different types of requests may be required for different types of information. A request may further require authentication.

The term "tamper-resistant housing" should be understood in a broad sense. The term indicates that the housing is resistant to tampering attempts up to a certain extent. The term does not necessarily indicate that the housing is totally tamper proof, although such an embodiment is not excluded.

In general, there are numerous different ways of implementing the invention, whereby different implementations may have different topologies. In any given topology, a single entity may carry out several functions, or several entities may jointly carry out a single function. In this respect, the drawings are very diagrammatic. There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

There are numerous ways of storing and distributing a set of instructions, that is, software, which allows a biometrics-based control device to operate in accordance with the invention. For example, software may be stored in a suitable device readable medium, such as, for example, a memory circuit, a magnetic disk, or an optical disk. A device readable medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. A biometrics-based control device having a tamper-resistant housing comprising:
   a biometric sensor adapted to acquire biometric data from a person;
   a user database adapted to comprise biometric data items, a biometric data item characterizing an authorized user;
   a processor adapted to cause the biometrics-based control device to execute a control action if the biometric data acquired through the biometric sensor corresponds with one of the biometric data items in the user database; and
   a communication interface adapted to establish a communication link with an external device,
   wherein the biometrics-based control device is adapted to grant the external device access to the user database only if the biometrics-based control device has biometrically verified the physical presence of an administrator by the acquisition of the biometric data through the biometric sensor of the biometrics-based control device itself, whereby the user database comprises at least one biometric data item that belongs to an administrator class and the acquired biometric data must correspond with the at least one biometric data item in the user database that belongs to the administrator class.

2. The biometrics-based control device according to claim 1, wherein the biometrics-based control device is adapted to prevent, by default, data from the external device from being transferred to the processor if the user database comprises the at least one biometric data item that belongs to the administrator class, a transfer of the data from the external device to the processor being allowed only if the biometrics-based control device has biometrically verified the physical presence of the administrator.

3. The biometrics-based control device according to claim 1, wherein the biometrics-based control device is adapted to disable, by default, the communication interface if the user database comprises the at least one biometric data item that belongs to the administrator class, the communication interface being temporarily enabled only if the biometrics-based control device has biometrically verified the physical presence of the administrator.

4. The biometrics-based control device according to claim 3, wherein, following a setting of the communication interface in an enabled state, the biometrics-based control device is adapted to set the communication interface back in a disabled state if no communication link has been established with the external device within a predetermined time interval since the setting of the communication interface in the enabled state.

5. The biometrics-based control device according to claim 3, wherein, following the setting of the communication interface in the enabled state, the biometrics-based control device is adapted to set the communication interface back in the disabled state if within a predetermined time interval no data has been received from the external device with which the communication link has been established.

6. The biometrics-based control device according to claim 3, wherein, following the setting of the communication interface in the enabled state, the biometrics-based control device is adapted to set the communication interface back in the disabled state in response to a deactivation command from the external device with which the communication interface has established the communication link.

7. The biometrics-based control device according to claim 1, wherein the processor is adapted to add an additional biometric data item in the user database following receipt of a user addition command from the external device through the communication interface, and to include in the additional biometric data item the biometric data that the biometric sensor has acquired following receipt of the user addition command.

8. The biometrics-based control device according to claim 7, wherein the processor is adapted to extract user identification data from the user addition command and to store the user identification data in association with the additional biometric data item.

9. The biometrics-based control device according to claim 8, wherein the processor is adapted to extract the user identification data from a user deletion command received from the external device through the communication interface, the processor being adapted to identify, in the user database, the additional biometric data item that is stored in association with the user identification data extracted from the user deletion command and to delete the additional biometric data item from the user database.

10. The biometrics-based control device according to claim 1, wherein the processor is adapted to send information concerning the biometric data items present in the user database, if any, to the external device.

11. The biometrics-based control device according to claim 10, wherein the information comprises at least an indication on whether the user database comprises the at least one biometric data item of the administrator class, or not.

12. The biometrics-based control device according to claim 1, further comprising an output circuit, wherein the control action comprises changing a state of the output circuit.

13. The biometrics-based control device according to claim 1, wherein the communication interface is adapted to establish a wireless communication link with the external device.

14. A method of operating a biometrics-based control device having a tamper-resistant housing that comprises a biometric sensor adapted to acquire biometric data from a person; a user database adapted to comprise biometric data items, a biometric data item characterizing an authorized user; a processor adapted to execute a computer program; and a communication interface adapted to establish a communication link with an external device, wherein the computer program enables the processor to carry out the method, comprising:
    causing the biometrics-based control device to execute a control action if the biometric data that the biometric sensor has acquired corresponds with one of the biometric data items in the user database,
    granting the external device access to the user database only if the biometrics-based control device has biometrically verified the physical presence of an administrator by the acquisition of the biometric data through the biometric sensor of the biometrics-based control device itself, whereby the user database comprises at least one biometric data item that belongs to an administrator class and the acquired biometric data must correspond with the at least one biometric data item in the user database that belongs to the administrator class.

15. A biometrically controlled system comprising an apparatus and a biometrics-based control device coupled to control the apparatus, the biometrics-based control device having a tamper-resistant housing comprising:
    a biometric sensor adapted to acquire biometric data from a person;
    a user database adapted to comprise biometric data items, a biometric data item characterizing an authorized user;
    a processor adapted to cause the biometrics-based control device to execute a control action if the biometric data acquired through the biometric sensor corresponds with one of the biometric data items in the user database; and
    a communication interface adapted to establish a communication link with an external device,
    wherein the biometrics-based control device is adapted grant the external device access to the user database only if the biometrics-based control device has biometrically verified the physical presence of an administrator by the acquisition of the biometric data through the biometric sensor of the biometrics-based control device, whereby the user database comprises at least one biometric data item that belongs to an administrator class and the acquired biometric data must correspond with the a biometric data item in the user database that belongs to the administrator class.

* * * * *